United States Patent
Qin et al.

(10) Patent No.: US 12,424,961 B2
(45) Date of Patent: Sep. 23, 2025

(54) BOOST CHARGING CONTROL METHOD, DEVICE, EQUIPMENT, AND STORAGE MEDIUM

(71) Applicant: ZF Friedrichshafen AG, Friedrichshafen (DE)

(72) Inventors: Yijin Qin, Shanghai (CN); Yulin Chen, Shanghai (CN); Weirong Yang, Shanghai (CN); Yinghao Zhang, Shanghai (CN); Shoulei Xu, Shanghai (CN)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 18/589,956

(22) Filed: Feb. 28, 2024

(65) Prior Publication Data

US 2024/0297605 A1 Sep. 5, 2024

(30) Foreign Application Priority Data

Feb. 28, 2023 (CN) .......................... 202310182364.5

(51) Int. Cl.
*H02P 27/06* (2006.01)
*H02J 7/00* (2006.01)
*H02J 7/14* (2006.01)

(52) U.S. Cl.
CPC ............ *H02P 27/06* (2013.01); *H02J 7/0063* (2013.01); *H02J 7/1476* (2013.01)

(58) Field of Classification Search
CPC ........ H02P 27/06; H02J 7/0063; H02J 7/1476
See application file for complete search history.

(56) References Cited

U.S. PATENT DOCUMENTS

| | | | |
|---|---|---|---|
| 2011/0234134 A1* | 9/2011 | Ramu | ...................... H02P 7/281 318/400.27 |
| 2013/0057193 A1* | 3/2013 | Iwaji | ...................... H02P 6/188 318/721 |
| 2015/0229247 A1* | 8/2015 | Nakai | ...................... B60L 7/14 318/400.02 |

* cited by examiner

*Primary Examiner* — Rexford N Barnie
*Assistant Examiner* — Duc M Pham
(74) *Attorney, Agent, or Firm* — Crowell & Moring LLP

(57) ABSTRACT

A boost charging control method, apparatus, and a storage medium, wherein the boost charging control method includes selecting, based on an electrical angle θ of the motor, two phase windings of a motor with top two inductance strengths as working windings. The method also includes controlling currents of the two phase windings, and setting a current of the other phase winding as zero, thereby causing the motor to generate a set torque. A boost charging control method, apparatus, and a storage medium are disclosed, which may cause a motor to generate a set torque, and reduce shaking and noise due to motor torque fluctuations.

10 Claims, 5 Drawing Sheets

BOOST CHARGING CONTROL METHOD, DEVICE, EQUIPMENT, AND STORAGE MEDIUM

CROSS-REFERENCE TO RELATED APPLICATION

This application claims priority to China Application No. 202310182364.5, filed on Feb. 28, 2023, the entirety of which is hereby fully incorporated by reference herein.

TECHNICAL FIELD

The present disclosure relates to the field of motor control technologies, and in particular, to a boost charging control method, apparatus, and device, and a storage medium.

BACKGROUND

In general, electric vehicles or plug-in hybrid electric vehicles convert electrical power provided by an external charging facility to electrical power in a condition suitable for charging batteries in the vehicles, and provide the converted electrical power to the batteries for charging the batteries.

For example, conventionally, a charging facility for fast charging is designed to output a single voltage specification of 400 V. However, batteries used in the vehicles are designed to have a voltage of 800 V or higher, to increase the efficiency and the distance till empty (DTE). Therefore, since even though a fast charging system still provides the charging voltage of 400 V, the batteries used in the vehicles have the voltage specification of 800 V or higher, there is a need for a boost converter that increases the voltage provided from the external charging facility in order for charging the batteries.

Chinese patent application no. 201910561242.0 discloses an apparatus for controlling a charging system using a motor drive system, which is configured to suppress a torque generated in a motor when charging a battery by receiving an external charging current supplied to a star point of the motor.

With reference to FIG. 1, the technical solution of the patent application mentioned above is that when the external charging current provided to the star point of the motor 20 is received, windings of the motor 20 and switch elements S1 to S6 of an inverter 30 are used to raise a voltage of the star point of the motor 20 up to a voltage level that is able to charge the battery 40. A star point current command and a rotor angle of the motor 20 are received, and based on a position of a, b, and c coordinates corresponding to the rotor angle of the motor 20, one of currents of three phases a, b, and c is set as zero, and currents of the other two phases which cause the torque of the motor 20 to be zero are determined.

However, in the patent mentioned above, when working phases are selected based on the rotor angle, an optimal level is not reached because a principle of selecting two phases with top two inductance strengths is not followed; and reaching the zero torque is not an optimal solution. Meshing of gears of the motor without gaps may be achieved if an appropriate torque is provided, thereby reducing shaking and noise due to torque fluctuations.

SUMMARY

In view of the above-mentioned problem of the prior art, the present disclosure discloses a boost charging control method, apparatus, and device, and a storage medium, which may cause a motor to generate a set torque, and reduce shaking and noise due to motor torque fluctuations.

Specifically, the present disclosure presents a boost charging control method suitable for a charging device to charge a motor drive system, the motor drive system including a battery, an inverter, and a motor, the inverter being used to receive direct current power stored in the battery during driving of the motor, so as to convert the received direct current power to three-phase alternating current power and output the three-phase alternating current power to the motor, the motor using the three-phase alternating current power output from the inverter to generate a torque, during boost charging, positive and negative electrodes of the charging device being respectively connected to a star point of the motor and a negative electrode of the battery, and the boost charging control method controlling a switch unit of the inverter to use windings of the motor to boost a voltage provided by the charging device, and outputting the voltage to the battery, The boost charging control method includes the steps of:
S1: selecting, based on an electrical angle θ of the motor, two phase windings of the motor with top two inductance strengths as working windings; and
S2: controlling currents of the two phase windings, and setting a current of the other phase winding as zero, thereby causing the motor to generate a set torque.

Since an inductance of each phase winding of a motor stator changes with the electrical angle of the motor, when the boost charging is performed by using the motor and the inverter, selecting the two phase windings with top two inductance strengths as the working windings based on the current electrical angle of the motor may reduce fluctuations of currents (the charging current) of windings. Due to direct association between the currents of the windings and a magnetic field of a rotor, alternation of the magnetic field on the rotor is reduced, thereby reducing loss on the rotor, and finally, heat generated by the rotor is reduced.

According to an embodiment of the present disclosure, in step S2, controlling currents of the two phase windings is achieved by controlling on and off of the switch unit of the inverter.

According to an embodiment of the present disclosure, in step S1,
if 330°≤the electrical angle θ<360°, 0°≤the electrical angle θ<30°, or 150°≤the electrical angle θ<210°, a b-phase winding and a c-phase winding of the motor with top two inductance strengths are selected; or
if 30°≤the electrical angle θ<90°, or 210°≤the electrical angle θ<270°, an a-phase winding and a b-phase winding of the motor with top two inductance strengths are selected; or
if 90°≤the electrical angle θ<150°, or 270°≤the electrical angle θ<330°, an a-phase winding and a c-phase winding of the motor with top two inductance strengths are selected.

According to an embodiment of the present disclosure, the set torque is greater than or equal to zero and less than 50 Nm.

According to an embodiment of the present disclosure, in step S2, the currents of the selected two phase windings are calculated based on currents of d and q axes determined based on the set torque, the law of sines, and relationships between a charging current of the charging device and currents of three phases a, b, and c.

According to an embodiment of the present disclosure, $I_A$, $I_B$, and $I_C$ are set as the currents of the three phases a, b, and c, and $I_d$, and $I_q$ are set as the currents of the d and q axes set based on the torque, in which $I_{A1}$, $I_{B1}$, and $I_{C1}$ are torque-controlled currents of the three phases a, b, and c, $I_{A2}$, $I_{B2}$, and $I_{C2}$ are charging-controlled currents of the three phases a, b, and c, and $I_{Charge}$ is the charging current, then formulas are established as follows:

$$I_A = I_{A1} + I_{A2},$$

$$I_B = I_{B1} + I_{B2},$$

$$I_C = I_{C1} + I_{C2}, \text{ and}$$

$$I_{Charge} = I_{A2} + I_{B2} + I_{C2};$$

if the two phase windings of the motor with top two inductance strengths are selected as the b-phase and c-phase windings, current calculation formulas for the two phase windings are:

$$\begin{bmatrix} I_{A1} \\ I_{B1} \\ I_{C1} \end{bmatrix} = \begin{bmatrix} \cos(\theta) & -\sin(\theta) \\ \cos\left(\theta - \frac{2}{3}\pi\right) & -\sin\left(\theta - \frac{2}{3}\pi\right) \\ \cos\left(\theta - \frac{4}{3}\pi\right) & -\sin\left(\theta - \frac{4}{3}\pi\right) \end{bmatrix} \begin{bmatrix} I_d \\ I_q \end{bmatrix}, \quad \text{formula (1)}$$

$$I_{A2} = -I_{A1}, \quad \text{formula (2)}$$

$$I_{B2} + I_{C2} = I_{Charge} - I_{A2}, \text{ and} \quad \text{formula (3)}$$

$$\frac{I_{B2}}{\sin(60° - \theta)} = \frac{I_{C2}}{\sin(60° + \theta)}, \quad \text{formula (4)}$$

currents $I_B$ and $I_C$ of the b-phase and c-phase windings are solved according to formulas (1) to (4); or
if the two phase windings of the motor with top two inductance strengths are selected as the a-phase and b-phase windings, current calculation formulas for the two phase windings are:

$$\begin{bmatrix} I_{A1} \\ I_{B1} \\ I_{C1} \end{bmatrix} = \begin{bmatrix} \cos(\theta) & -\sin(\theta) \\ \cos\left(\theta - \frac{2}{3}\pi\right) & -\sin\left(\theta - \frac{2}{3}\pi\right) \\ \cos\left(\theta - \frac{4}{3}\pi\right) & -\sin\left(\theta - \frac{4}{3}\pi\right) \end{bmatrix} \begin{bmatrix} I_d \\ I_q \end{bmatrix}, \quad \text{formula (1)}$$

$$I_{C2} = -I_{C1}, \quad \text{formula (5)}$$

$$I_{A2} + I_{B2} = I_{Charge} - I_{C2}, \text{ and} \quad \text{formula (6)}$$

$$\frac{I_{B2}}{\sin(\theta)} = \frac{I_{A2}}{\sin(120° - \theta)}, \quad \text{formula (7)}$$

currents $I_A$ and $I_B$ of the a-phase and b-phase windings are solved according to formulas (1), and (5) to (7); or
if the two phase windings of the motor with top two inductance strengths are selected as the a-phase and c-phase windings, current calculation formulas for the two phase windings are:

$$\begin{bmatrix} I_{A1} \\ I_{B1} \\ I_{C1} \end{bmatrix} = \begin{bmatrix} \cos(\theta) & -\sin(\theta) \\ \cos(\theta - \frac{2}{3}\pi) & -\sin\left(\theta - \frac{2}{3}\pi\right) \\ \cos(\theta - \frac{4}{3}\pi) & -\sin\left(\theta - \frac{4}{3}\pi\right) \end{bmatrix} \begin{bmatrix} I_d \\ I_q \end{bmatrix}, \quad \text{formula (1)}$$

-continued $$I_{B2} = -I_{B1}, \quad \text{formula (8)}$$

$$I_{A2} + I_{C2} = I_{Charge} - I_{B2}, \text{ and} \quad \text{formula (9)}$$

$$\frac{I_{A2}}{\sin(\theta - 60°)} = \frac{I_{C2}}{\sin(180° - \theta)}, \quad \text{formula (10)}$$

currents $I_A$ and $I_C$ of the a-phase and c-phase windings are solved according to formulas (1), and (8) to (10).

The present disclosure further provides a boost charging control apparatus suitable for the boost charging control method mentioned above. The boost charging control apparatus includes:

a selection module configured to select, based on an electrical angle θ of the motor, two phase windings of a motor with top two inductance strengths as working windings;

a calculation module configured to set a current of the other phase winding as zero, and calculate currents of the two phase windings based on a set torque of the motor; and a control module configured to control the currents of the two phase windings to reach calculation results of the calculation module, so as to cause the motor to generate the set torque.

According to an embodiment of the present disclosure, the calculation module is configured to calculate the currents of the selected two phase windings based on currents of d and q axes determined based on the set torque, the law of sines, and relationships between a charging current of the charging device and currents of three phases a, b, and c.

According to an embodiment of the present disclosure, the set torque is larger than or equal to zero and smaller than 50 Nm.

The present disclosure further provides a boost charging control device, which includes a memory, a processor, and a computer program stored on the memory and operable on the processor, where when the processor executes the computer program, any one of the steps of the boost charging control method mentioned above is implemented.

The present disclosure further provides a computer-readable storage medium, having stored thereon a computer program that, when executed by a processor, implements any one of the steps of the boost charging control method.

The present disclosure provides a boost charging control method, apparatus, and device, and a storage medium, in which two phase windings of a motor with top two inductance strengths are selected based on an electrical angle θ of the motor, and currents of the two phase windings are controlled, which may cause the motor to generate a set torque, and reduce shaking and noise due to motor torque fluctuations.

It should be understood that, the above general description and the following detailed description of the present disclosure are both exemplary and illustrative, and are intended to provide further explanation for the present invention set forth in the claims.

The accompanying drawings are included to provide further explanation of the present disclosure and are incorporated into and constitute a part of the present application, show the embodiments of the present disclosure, and serve to, together with the description, explain the principles of the present disclosure.

DETAILED DESCRIPTION

Figure 1:
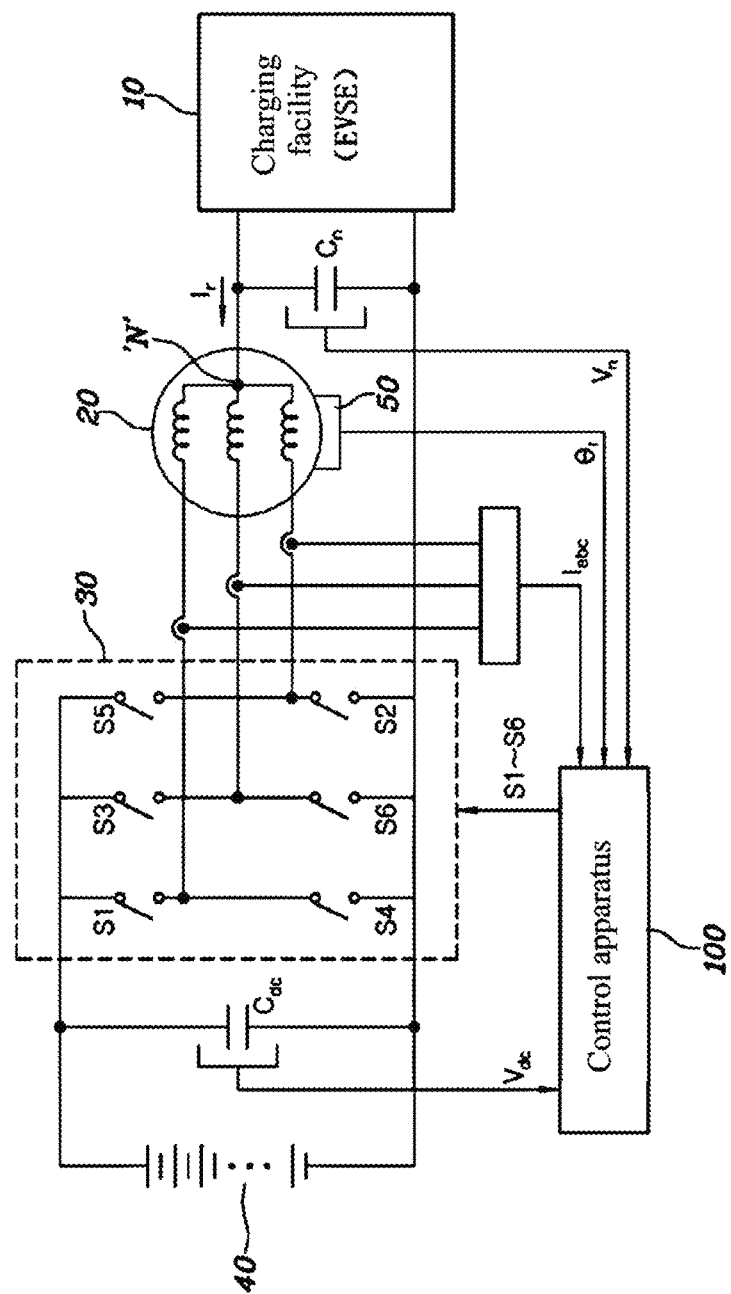
FIG. 1 shows a circuit diagram of a charging system using a motor drive system in the prior art.

It should be noted that the embodiments in the present application and the features in the embodiments can be combined with each other without conflict.

The technical solutions in the embodiments of the present application will be clearly and completely described below in conjunction with the accompanying drawings in the embodiments of the present application. Apparently, the described embodiments are some rather than all of the embodiments of the present application. The following description of at least one exemplary embodiment is actually merely illustrative, and in no way serves as any limitation to the present application and its application or use. All other embodiments obtained by those of ordinary skill in the art based on the embodiments of the present application without any creative effort shall fall within the scope of protection of the present application.

It should be noted that, the terms used here are for the purpose of describing particular embodiments only, but not limiting exemplary embodiments according to the present application. As used here, the singular forms are intended to include plural forms as well, unless the context clearly indicates otherwise. In addition, it should also be understood that the terms "contain" and/or "include/comprise" used in the specification specify the presence of the features, steps, operations, devices, assemblies and/or combinations thereof.

Unless otherwise indicated specifically, the relative arrangement, numerical expressions and values of the components and steps set forth in these embodiments do not limit the scope of the present application. Moreover, it should be understood that for ease of description, the parts shown in the figures are not drawn according to an actual scale. Technologies, methods and devices known to those of ordinary skill in the related art may not be discussed in detail, but should be considered as part of the specification where appropriate. In all of the examples shown and discussed here, any specific value should be construed as merely exemplary but not limiting. Therefore, other examples of exemplary embodiments may have different values. It should be noted that similar reference signs and letters refer to similar items in the following drawings. Therefore, once an item is defined in one of the drawings, it is not necessary to further discuss the item in subsequent drawings.

In the description of the present application, it should be understood that orientations or position relationships indicated by orientation terms such as "front, rear, up, down, left, and right", "transverse, vertical, perpendicular, and horizontal", and "top and bottom" are generally based on orientations or position relationships shown in the drawings and are merely for ease of description of the present application and simplification of the description, rather than indicating and implying that the apparatuses or elements referred to must have a specific orientation or be constructed and operated in a specific orientation if there is no explanation to the contrary, and therefore cannot be construed as limiting the scope of protection of the present application. The orientation terms "interior and exterior" refer to inside and outside relative to a contour of each component itself.

In addition, it should be noted that, the use of terms such as "first" and "second" to define parts is merely for ease of facilitating differentiation of the corresponding parts. If not otherwise stated, the above terms have no special meanings and thus cannot be construed as limiting the scope of protection of the present application. Furthermore, although the terms used in the present application are selected from well-known common terms, some of the terms mentioned in the description of the present application may have been selected by the applicant according to his or her determination, and the detailed meaning thereof is described in the relevant section described herein. Furthermore, the present application must be understood, not simply by the actual terms used but also by the meanings encompassed by each term.

Figure 2:
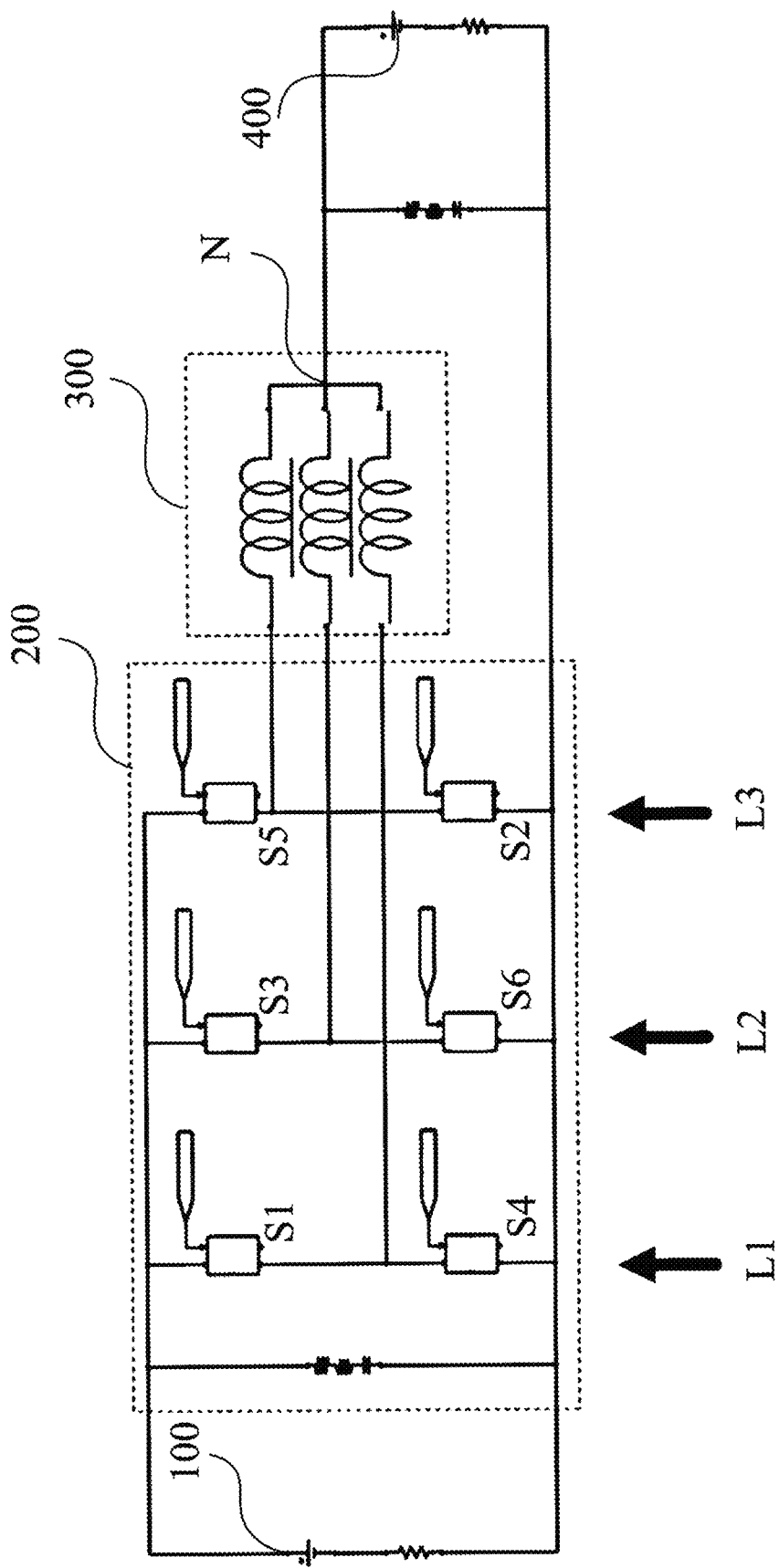
FIG. 2 shows a circuit diagram of a charging device suitable for the present disclosure charging a motor drive system.

FIG. 2 shows a circuit diagram of a charging device suitable for the present disclosure charging a motor drive system. As shown in the figure, referring to FIG. 1, a motor drive system, to which an exemplary embodiment of the present disclosure is applied, includes a battery 100, an inverter 200, and a drive motor 300. A charging device 400 charges the battery 100 (the battery 100 is an energy storage apparatus, and may be a traction battery) with the inverter 200 and the drive motor 300. Further, the charging device 400 may be directly connected to positive and negative electrodes of the battery 100 (this connection is not shown in FIG. 2), and may directly charge the battery 100 without the inverter 200 and the drive motor 300. The charging device 400 may be a charging pile. The boost charging control method of the present disclosure is not limited to using a generic charging pile to charge a battery, but also suitable for situations in which another type of charging device is used for charging.

In general, the battery 100 is an energy storage apparatus which stores power for the drive motor 300, and the inverter 200 converts direct current power stored in the battery 100 to three-phase alternating current power, and provides the three-phase alternating current power to the motor 300. The motor drive system may further include a rotor angle sensor, for detecting an electrical angle of the motor 300. The electrical angle of the motor 300 equals to a mechanical angle of a rotor of the motor 300 multiplied by a number of pole pairs of the motor.

Three bridge arms of the inverter 200 are connected in parallel to each other and to both terminals of the battery 100. In each bridge arm, two switch elements (two of switch elements S1 to S6) are connected in series to each other, and driving power of one phase is provided to one phase winding of a stator of the motor 300 at a connection node between the two switch elements. In this way, an energy flow for the drive motor 300 is achieved in a direction from the battery 100 to the motor 300.

Therefore, a boost circuit may be formed by one of three phase windings (conducting windings) of the motor 300 and the switch elements S1 to S6 connected thereto in bridge arms L1 to L3 of the inverter 200. In other words, a circuit is formed such that there are three boost circuits in total connected in parallel between a star point N of the motor 300 and the battery 100 through the three-phase motor 300 and the three-phase inverter 200.

With application of various embodiments of the present disclosure, external charging power, that is provided from the charging device 400 to the star point N of the motor 300 with a bridge arm corresponding each phase of the inverter 200, may be received, the switch elements in each bridge arm may be controlled, and a voltage provided by the charging pile 400 to the star point N of the motor 300 may be increased and then provided to the battery 100, thereby charging the battery 100.

That is, during processes where various embodiments of the present disclosure are applied, a connection terminal of the inverter 200 on the side of the motor 300 is configured as an input terminal of the inverter 200, and a connection terminal of the inverter 200 on the side of the battery 100 is configured as an output terminal of the inverter 200. In a discharging state of the motor drive system, the inverter 200 is used to receive the direct current power stored in the battery 100 during driving of the motor 300, to convert the received direct current power to three-phase alternating current power and to output the three-phase alternating current power to the motor 300, and the motor 300 uses the three-phase alternating current power output by the inverter 200 to generate a torque. In a charging state of the motor drive system, when the charging device 400 provides an external charging current to the star point N of the motor 300 by using the boost charging control method provided in the present disclosure, the charging device increases a voltage level of the star point N of the motor 300 by controlling the switch elements in the inverter 200, and outputs the voltage to the battery 100.

In comparison to the case that the motor drive system is in the discharging state, an energy flow is generated in an opposite direction in the case that the motor drive system is used for charging. That is, in the motor drive system, if a direction of a current flowing from the inverter 200 to the motor 300 is a positive (+) direction, a direction of a current, in the charging state, flowing from the motor 300 to the inverter 200 is a negative (−) direction. Therefore, when the motor drive system is used for charging, a current command or a detected phase current may be determined to be a negative value, and the switch elements S1 to S6 in the inverter 200 may be controlled in a similar way to the motor drive system.

Figure 3A:
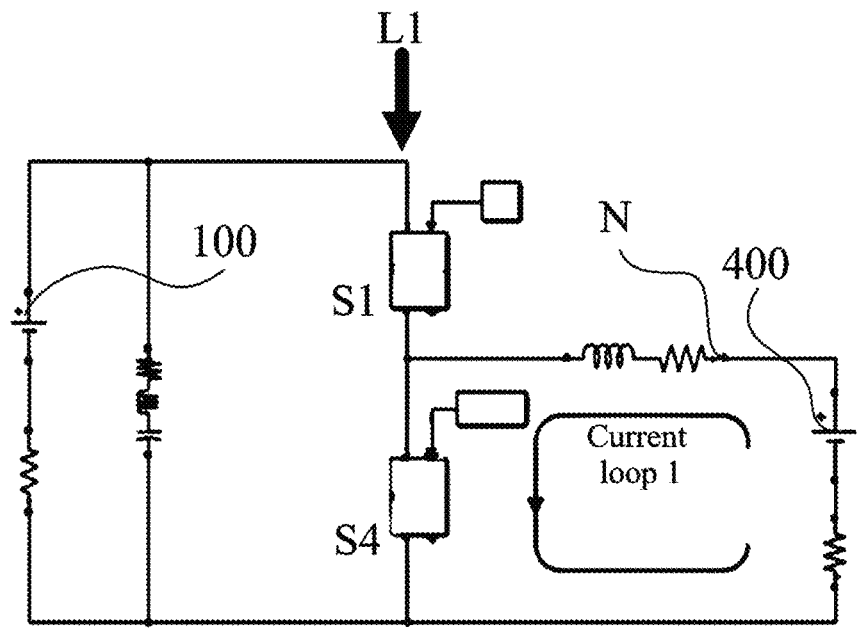
FIG. 3A is a circuit diagram when windings in FIG. 2 are in a charging state.
Figure 3B:
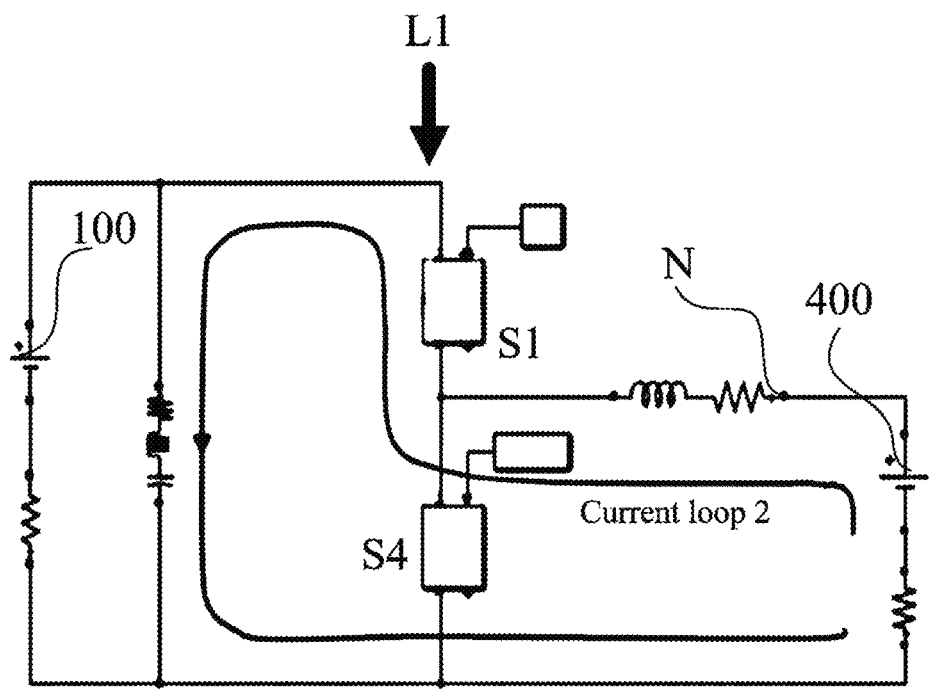
FIG. 3B is a circuit diagram when the windings in FIG. 2 are in a discharging state.

FIG. 3A is a circuit diagram when windings in FIG. 2 are in a charging state. FIG. 3B is a circuit diagram when the windings in FIG. 2 are in a discharging state. As shown in FIG. 3A and FIG. 3B, the bridge arm L1 of the inverter 200 in FIG. 2 is selected to briefly illustrate a boost charging process. The bridge arm L1 includes an upper switch element S1 and a lower switch element S4, which are connected in series. A connection node of the upper switch element S1 and the lower switch element S4 is connected to one phase winding of the motor 300.

During charging, positive and negative electrodes of the charging device are respectively connected to the star point of the three-phase motor 300 and the negative electrode of the battery 100, the windings of the motor 300 are used as inductors, and a boost circuit is formed by one of the three phase windings, and the upper switch element S1 and the lower switch element S4 of the inverter 200 connected thereto.

Referring to FIG. 3A, first, in the inverter 200, the upper switch element S1 is controlled to be turned off, and the lower switch element S4 is controlled to be turned on, thereby resulting in a current flow loop, which is shown in the figure as a current loop 1 with a direction indicated by an arrow, so that the charging device charges the winding of the motor 300. Then, referring to FIG. 3B, in the inverter 200, the upper switch element S1 is controlled to be turned on, and the lower switch element S4 is controlled to be turned off, thereby resulting in a current flow loop, which is shown in the figure as a current loop 2 with a direction indicated by an arrow, so that the winding is caused to discharge, and a voltage of the winding will be superposed on a voltage of the charging device for charging the battery 100.

Figure 4:
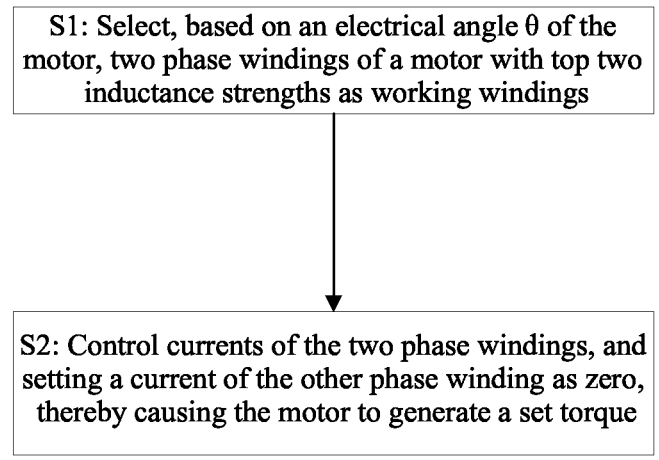
FIG. 4 is a flow block diagram of a boost charging control method according to an embodiment of the present disclosure.

FIG. 4 is a flow block diagram of a boost charging control method according to an embodiment of the present disclosure. As shown in the figure, the present disclosure provides a boost charging control method suitable for the charging device 400 in FIG. 2 to charge the motor drive system. The boost charging control method includes the steps of:

S1: selecting, based on an electrical angle θ of the motor 300, two phase windings of the motor 300 with top two inductance strengths as working windings, thereby reducing current ripples and thus loss on the rotor; and S2: controlling currents of the selected two phase windings, and setting a current of the other phase winding as zero, thereby causing the motor 300 to generate a set torque. Achieving the set torque through current control may result in meshing of gears of the motor 300 without gaps, thereby reducing shaking and noise due to torque fluctuations.

Preferably, in step S2, controlling currents of the two phase windings is achieved by controlling on and off of a switch unit of the inverter 200.

Further, L_A, L_B, and L_C are respectively set as inductances of the three phase windings of the motor 300, $I_A$, $I_B$, and $I_C$ are respectively currents (currents of three phases a, b, and c) flowing through an a-phase winding, a b-phase winding, and a c-phase winding of the motor 300. According to the present disclosure, if the electrical angle θ is between 0° and 30°, it may be obtained that L_B>L_C>L_A, the b-phase winding and the c-phase winding of the motor 300 with top two inductance strengths are selected. Similarly, two phase windings with top two inductance strengths under different electrical angles θ may be obtained.

Therefore, preferably, in step S1, if 330°≤the electrical angle θ<360°, 0°≤the electrical angle θ<30°, or 150°≤the electrical angle θ<210°, the b-phase winding, and the c-phase winding of the motor with top two inductance strengths are selected; or if 30°≤the electrical angle θ<90°, or 210°≤the electrical angle θ<270°, the a-phase winding, and the b-phase winding of the motor with top two inductance strengths are selected; or if 90°≤the electrical angle θ<150°, or 270°≤the electrical angle θ<330°, the a-phase winding, and the c-phase winding of the motor with top two inductance strengths are selected.

Preferably, the set torque is greater than or equal to zero and less than 50 Nm, which may result in meshing of gears of the motor without gaps, thereby reducing shaking and noise due to torque fluctuations.

Preferably, in step S2, the currents of the selected two phase windings are calculated based on currents of d and q axes determined based on the set torque, the law of sines, and relationships between a charging current of the charging device and the currents of the three phases a, b, and c.

Specifically, $I_A$, $I_B$, and $I_C$ are set as the currents of the three phases a, b, and c, and $I_d$, and $I_q$ are set as the currents of the d and q axes determined based on the set torque, in which $I_{A1}$, $I_{B1}$, and $I_{C1}$ are torque-controlled currents of the three phases a, b, and c, $I_{A2}$, $I_{B2}$, and $I_{C2}$ are charging-controlled currents of the three phases a, b, and c, and $I_{Charge}$ is the charging current, then formulas are established as follows:

$I_A = I_{A1} + I_{A2}$, where the current $I_A$ of the phase a is a sum of a torque-controlled current $I_{A1}$ of the phase a and a charging-controlled current $I_{A2}$ of the phase a;

$I_B = I_{B1} + I_{B2}$, where the current $I_B$ of the phase b is a sum of a torque-controlled current $I_{B1}$ of the phase b and a charging-controlled current $I_{B2}$ of the phase b;

$I_C = I_{C1} + I_{C2}$, where the current $I_C$ of the phase c is a sum of a torque-controlled current $I_{C1}$ of the phase c and a charging-controlled current Ice of the phase c; and $I_{Charge} = I_{A2} + I_{B2} + I_{C2}$, the charging current $I_{Charge}$ is a sum of the charging-controlled currents $I_{A2}$, $I_{B2}$, and Ice of the three phases.

If the two phase windings of the motor with top two inductance strengths are selected as the b-phase and c-phase windings, the a-phase winding does not work, and current calculation formulas for the windings of the phases b and c are:

$$\begin{bmatrix} I_{A1} \\ I_{B1} \\ I_{C1} \end{bmatrix} = \begin{bmatrix} \cos(\theta) & -\sin(\theta) \\ \cos(\theta - \frac{2}{3}\pi) & -\sin(\theta - \frac{2}{3}\pi) \\ \cos(\theta - \frac{4}{3}\pi) & -\sin(\theta - \frac{4}{3}\pi) \end{bmatrix} \begin{bmatrix} I_d \\ I_q \end{bmatrix}, \quad \text{formula (1)}$$

that is, according to the inverse Park transform, magnitudes of the torque-controlled currents of the three phases may be specifically determined;

$$I_{A2} = -I_{A1}, \quad \text{formula (2)}$$

which is obtained on a basis that the current of the phase a is 0, i.e., $I_A = I_{A1} + I_{A2} = 0$;

$$I_{B2} + I_{C2} = I_{Charge} - I_{A2}, \quad \text{formula (3)}$$

which is obtained according to the formula $I_{Charge} = I_{A2} + I_{B2} + I_{C2}$ for the charging current mentioned above; and $$\frac{I_{B2}}{\sin(60° - \theta)} = \frac{I_{C2}}{\sin(60° + \theta)}, \quad \text{formula (4)}$$

which is determined according to the law of sines, and on a condition that since no torque is generated by the charging currents of the b-phase and c-phase windings, a direction of their current vectors is the same as that of the rotor.

The currents $I_B$ and $I_C$ of the b-phase and c-phase windings are solved according to formulas (1) to (4).

Similarly, if the two phase windings of the motor with top two inductance strengths are selected as the a-phase and b-phase windings, current calculation formulas for the two phase windings are:

$$\begin{bmatrix} I_{A1} \\ I_{B1} \\ I_{C1} \end{bmatrix} = \begin{bmatrix} \cos(\theta) & -\sin(\theta) \\ \cos(\theta - \frac{2}{3}\pi) & -\sin(\theta - \frac{2}{3}\pi) \\ \cos(\theta - \frac{4}{3}\pi) & -\sin(\theta - \frac{4}{3}\pi) \end{bmatrix} \begin{bmatrix} I_d \\ I_q \end{bmatrix}, \quad \text{formula (1)}$$

$$I_{C2} = -I_{C2}, \quad \text{formula (5)}$$

$$I_{A2} + I_{B2} = I_{Charge} - I_{C2}, \text{ and} \quad \text{formula (6)}$$

$$\frac{I_{B2}}{\sin(\theta)} = \frac{I_{A2}}{\sin(120° - \theta)}. \quad \text{formula (7)}$$

The currents $I_A$ and $I_B$ of the a-phase and b-phase windings are solved according to formulas (1), and (5) to (7).

Similarly, if the two phase windings of the motor with top two inductance strengths are selected as the a-phase and c-phase windings, current calculation formulas for the two phase windings are:

$$\begin{bmatrix} I_{A1} \\ I_{B1} \\ I_{C1} \end{bmatrix} = \begin{bmatrix} \cos(\theta) & -\sin(\theta) \\ \cos(\theta - \frac{2}{3}\pi) & -\sin(\theta - \frac{2}{3}\pi) \\ \cos(\theta - \frac{4}{3}\pi) & -\sin(\theta - \frac{4}{3}\pi) \end{bmatrix} \begin{bmatrix} I_d \\ I_q \end{bmatrix}, \quad \text{formula (1)}$$

$$I_{B2} = -I_{B1}, \quad \text{formula (8)}$$

$$I_{A2} + I_{C2} = I_{Charge} - I_{B2}, \text{ and} \quad \text{formula (9)}$$

$$\frac{I_{A2}}{\sin(\theta - 60°)} = \frac{I_{C2}}{\sin(180° - \theta)}. \quad \text{formula (10)}$$

The currents $I_A$ and $I_C$ of the a-phase and c-phase windings are solved according to formulas (1), and (8) to (10).

It is readily understood that if the set torque is 0, the corresponding currents of the d and q axes $I_d$, and $I_q$ are 0, and the formulas mentioned above may be simplified as follows.

If the two phase windings of the motor with top two inductance strengths are selected as the b-phase and c-phase windings, current calculation formulas for the two phase windings are:

$$\frac{I_B}{\sin(60° - \theta)} = \frac{I_C}{\sin(60° + \theta)}, \quad \text{formula (11)}$$

which is determined according to the law of sines; and $$I_{Charge} = I_B + I_C, \quad \text{formula (12)}$$

which is determined according to the formula for the charging current.

The currents $I_B$ and $I_C$ of the b-phase and c-phase windings are solved according to formulas (11) and (12).

If the two phase windings of the motor with top two inductance strengths are selected as the a-phase and b-phase windings, current calculation formulas for the two phase windings are:

$$\frac{I_{B2}}{\sin(\theta)} = \frac{I_{A2}}{\sin(120° - \theta)}, \text{ and} \qquad \text{formula (13)}$$

$$I_{Charge} = I_A + I_B. \qquad \text{formula (14)}$$

The currents $I_A$ and $I_B$ of the a-phase and b-phase windings are solved according to formulas (13) and (14).

if the two phase windings of the motor with top two inductance strengths are selected as the a-phase and c-phase windings, current calculation formulas for the two phase windings are:

$$\frac{I_{A2}}{\sin(\theta - 60°)} = \frac{I_{C2}}{\sin(180° - \theta)}, \text{ and} \qquad \text{formula (15)}$$

$$I_{Charge} = I_A + I_C. \qquad \text{formula (16)}$$

The currents $I_A$ and $I_C$ of the a-phase and c-phase windings are solved according to formulas (15) and (16).

Figure 5:
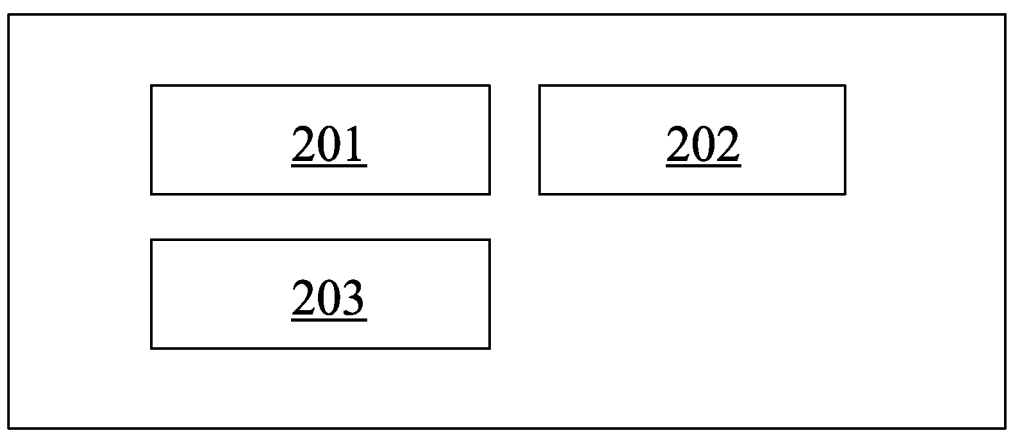
FIG. 5 is a schematic diagram of a structure of a boost charging control apparatus according to an embodiment of the present disclosure.

The present disclosure further provides a boost charging control apparatus suitable for the boost charging control method mentioned above. FIG. 5 is a schematic diagram of a structure of a boost charging control apparatus according to an embodiment of the present disclosure. As shown in the figure, the boost charging control apparatus 200 mainly includes a selection module 201, a calculation module 202, and a control module 203.

The selection module 201 is configured to select, based on an electrical angle θ of the motor, two phase windings of a motor with top two inductance strengths as working windings.

The calculation module 202 is configured to set a current of the other phase winding as zero, and calculate currents of the two phase windings based on a set torque of the motor.

The control module 203 is configured to control the currents of the two phase windings to reach calculation results of the calculation module, so as to cause the motor to generate the set torque.

Preferably, the set torque is greater than or equal to zero and less than 50 Nm.

The present disclosure further provides a boost charging control device, which includes a memory, a processor, and a computer program stored on the memory and operable on the processor, where when the processor executes the computer program, any one of the steps of the vehicle load estimation mentioned above is implemented.

The present disclosure further provides a computer-readable storage medium, having stored thereon a computer program that, when executed by a processor, implements any one of the steps of the vehicle load estimation.

Specific implementations and technical effects of the boost charging control apparatus, the boost charging control device, and the computer-readable storage medium can all be referred to the above-mentioned embodiment of vehicle load estimation provided in the present disclosure, which will not be repeated here.

Those skilled in the art further appreciated that the various explanatory logical blocks, modules, circuits and algorithm steps described in conjunction with the embodiments disclosed herein can be implemented as electronic hardware, computer software or a combination of both. To explain this interchangeability of hardware and software clearly, various explanatory assembly, blocks, modules, circuits, and steps are described above generally in their functional forms. Whether such functionality is implemented as hardware or software depends on the specific application and design constraints applied on the overall system. Technical personnel can implement the described functionality in a different manner for each specific application, but such implementation decisions should not be construed as departing from the scope of the present disclosure.

Various explanatory logical modules and circuits described in connection with the embodiments disclosed herein can be implemented or executed by using a general-purpose processor, a digital signal processor (DSP), an application-specific integrated circuit (ASIC), a field programmable gate array (FPGA) or other programmable logic devices, a discrete gate or a transistor logic, a discrete hardware assembly, or any combination thereof designed to execute the functions described herein. The general-purpose processor may be a microprocessor, and alternatively, the processor may be any conventional processor, controller, micro-controller or state machine. The processor may also be implemented as a combination of computing devices, e.g., a combination of a DSP and a microprocessor, a plurality of microprocessors, one or more microprocessors in cooperation with a DSP core, or any other such configurations.

The steps of the method or algorithm described in conjunction with the embodiments disclosed herein may be embodied directly in hardware, in a software module executed by a processor, or in a combination of the two. The software module may reside in a RAM memory, a flash memory, a ROM memory, an EPROM memory, an EEPROM memory, a register, a hard disk, a removable disk, a CD-ROM, or any other form of storage medium known in the art. An exemplary storage medium is coupled to a processor such that the processor can read and write information from/to the storage medium. In an alternative, the storage medium may be integrated into the processor. The processor and the storage medium may reside in an ASIC. The ASIC may reside in a user terminal. In an alternative, the processor and the storage medium may reside in the user terminal as discrete assemblies.

In one or more exemplary embodiments, the functions described may be implemented in hardware, software, firmware, or any combination thereof. If implemented as a computer program product in software, the functions may be stored on or transmitted over a computer-readable medium as one or more instructions or code. The computer-readable medium includes both a computer storage medium and a communication medium including any medium that facilitates transfer of a computer program from one place to another. The storage medium may be any available medium that can be accessed by a computer. By way of example, without limitation, such a computer-readable medium may include a RAM, a ROM, an EEPROM, a CD-ROM or other optical disk storage, magnetic disk storage or other magnetic storage devices, or any other media that can be used to carry or store suitable program code in the form of instructions or data structures and that can be accessed by a computer. Any connection is also properly termed a computer-readable medium. For example, if the software is transmitted from a web site, a server, or other remote sources using a coaxial cable, a fiber optic cable, a twisted pair, a digital subscriber line (DSL), or wireless technologies such as infrared, radio, and microwaves, the coaxial cable, the fiber optic cable, the twisted pair, the DSL, or the wireless technologies such as infrared, radio, and microwaves are included in the definition of the medium. The disk and disc as used herein include a compact disc (CD), a laser disc, an optical disc, a digital versatile disc (DVD), a floppy disk, and a blu-ray disc, where the disk is often used to magnetically reproduce data, and the disc is used to optically reproduce data by using laser light. A combination of the above should also be included within the range of the computer-readable medium.

It will be apparent to those skilled in the art that various modifications and variations can be made in the above-mentioned exemplary embodiments of the present disclosure without departing from the spirit and scope of the present disclosure. Thus, it is intended that the present disclosure cover the modifications and variations on the present disclosure falling within the scope of the appended claims and their equivalent technical solutions.

What is claimed is:

1. A boost charging control method for a charging device to charge a motor drive system, the motor drive system comprising a battery, an inverter, and a motor, the inverter being used to receive direct current power stored in the battery during driving of the motor, so as to convert the received direct current power to three-phase alternating current power and output the three-phase alternating current power to the motor, the motor using the three-phase alternating current power output from the inverter to generate a torque, during boost charging, positive and negative electrodes of the charging device being respectively connected to a star point of the motor and a negative electrode of the battery, and the boost charging control method controlling a switch unit of the inverter to use windings of the motor to boost a voltage provided by the charging device, and outputting the voltage to the battery, wherein the boost charging control method comprises:
selecting, based on an electrical angle θ of the motor, two phase windings of the motor with top two inductance strengths as working windings; and
controlling currents of the two phase windings, and setting a current of the other phase winding as zero, thereby causing the motor to generate a set torque.

2. The boost charging control method according to claim 1, wherein controlling currents of the two phase windings comprises controlling on and off of the switch unit of the inverter.

3. The boost charging control method according to claim 1, wherein selecting the two phase windings of the motor comprises:
selecting a b-phase winding and a c-phase winding of the motor with top two inductance strengths in response to 330°≤the electrical angle θ<360°, 0°≤the electrical angle θ<30°, or 150°≤the electrical angle θ<210°; or
selecting an a-phase winding and the b-phase winding of the motor with top two inductance strengths in response to 30°≤the electrical angle θ<90°, or 210°≤the electrical angle θ<270°; or
the a-phase winding and the c-phase winding of the motor with top two inductance strengths in response to 90°≤the electrical angle θ<150°, or 270°≤the electrical angle θ<330°.

4. The boost charging control method according to claim 1, wherein the set torque is greater than or equal to zero and less than 50 Nm.

5. The boost charging control method according to claim 4, wherein controlling currents of the two phase windings comprises calculating the currents of the selected two phase windings based on currents of d and q axes determined based on the set torque, the law of sines, and relationships between a charging current of the charging device and currents of three phases a, b, and c.

6. The boost charging control method according to claim 5, wherein $I_A$, $I_B$, and $I_C$ are set as the currents of the three phases a, b, and c, and $I_d$ and $I_q$ are set as the currents of the d and q axes set based on the torque, in which $I_{A1}$, $I_{B1}$, and $I_{C1}$ are torque-controlled currents of the three phases a, b, and c, $I_{A2}$, $I_{B2}$, and $I_{C2}$ are charging-controlled currents of the three phases a, b, and c, and $I_{Charge}$ is the charging current, then formulas are established as follows:

$$I_A = I_{A1} + I_{A2},$$
$$I_B = I_{B1} + I_{B2},$$
$$I_C = I_{C1} + I_{C2}, \text{ and}$$
$$I_{Charge} = I_{A2} + I_{B2} + I_{C2};$$

if the two phase windings of the motor with top two inductance strengths are selected as the b-phase and c-phase windings, current calculation formulas for the two phase windings are:

$$\begin{bmatrix} I_{A1} \\ I_{B1} \\ I_{C1} \end{bmatrix} = \begin{bmatrix} \cos(\theta) & -\sin(\theta) \\ \cos(\theta - \frac{2}{3}\pi) & -\sin(\theta - \frac{2}{3}\pi) \\ \cos(\theta - \frac{4}{3}\pi) & -\sin(\theta - \frac{4}{3}\pi) \end{bmatrix} \begin{bmatrix} I_d \\ I_q \end{bmatrix}, \quad \text{formula (1)}$$

$$I_{A2} = -I_{A1}, \quad \text{formula (2)}$$

$$I_{B2} + I_{C2} = I_{Charge} - I_{A2}, \text{ and} \quad \text{formula (3)}$$

$$\frac{I_{B2}}{\sin(60° - \theta)} = \frac{I_{C2}}{\sin(60° + \theta)}, \quad \text{formula (4)}$$

currents $I_B$ and $I_C$ of the b-phase and c-phase windings are solved according to formulas (1) to (4); or
if the two phase windings of the motor with top two inductance strengths are selected as the a-phase and b-phase windings, current calculation formulas for the two phase windings are:

$$\begin{bmatrix} I_{A1} \\ I_{B1} \\ I_{C1} \end{bmatrix} = \begin{bmatrix} \cos(\theta) & -\sin(\theta) \\ \cos(\theta - \frac{2}{3}\pi) & -\sin(\theta - \frac{2}{3}\pi) \\ \cos(\theta - \frac{4}{3}\pi) & -\sin(\theta - \frac{4}{3}\pi) \end{bmatrix} \begin{bmatrix} I_d \\ I_q \end{bmatrix}, \quad \text{formula (1)}$$

$$I_{C2} = -I_{C2}, \quad \text{formula (5)}$$

$$I_{A2} + I_{B2} = I_{Charge} - I_{C2}, \text{ and} \quad \text{formula (6)}$$

$$\frac{I_{B2}}{\sin(\theta)} = \frac{I_{A2}}{\sin(120° - \theta)}, \quad \text{formula (7)}$$

currents $I_A$ and $I_B$ of the a-phase and b-phase windings are solved according to formulas (1), and (5) to (7); or
if the two phase windings of the motor with top two inductance strengths are selected as the a-phase and c-phase windings, current calculation formulas for the two phase windings are:

$$\begin{bmatrix} I_{A1} \\ I_{B1} \\ I_{C1} \end{bmatrix} = \begin{bmatrix} \cos(\theta) & -\sin(\theta) \\ \cos(\theta - \frac{2}{3}\pi) & -\sin(\theta - \frac{2}{3}\pi) \\ \cos(\theta - \frac{4}{3}\pi) & -\sin(\theta - \frac{4}{3}\pi) \end{bmatrix} \begin{bmatrix} I_d \\ I_q \end{bmatrix}, \quad \text{formula (1)}$$

-continued $$I_{B2} = -I_{B1}, \quad \text{formula (8)}$$

$$I_{A2} + I_{C2} = I_{Charge} - I_{B2}, \text{ and} \quad \text{formula (9)}$$

$$\frac{I_{A2}}{\sin(\theta - 60°)} = \frac{I_{C2}}{\sin(180° - \theta)}, \quad \text{formula (10)}$$

currents $I_A$ and $I_C$ of the a-phase and c-phase windings are solved according to formulas (1), and (8) to (10).

7. A boost charging control apparatus comprising at least one processing device configured to:
- select, based on an electrical angle θ of a motor, two phase windings of the motor with top two inductance strengths as working windings;
- set a current of the other phase winding as zero, and calculate currents of the two phase windings based on a set torque of the motor; and
- control the currents of the two phase windings to reach the calculated currents, so as to cause the motor to generate the set torque.

8. The boost charging control apparatus according to claim 7, wherein the at least one processing device is configured to:
calculate the currents of the selected two phase windings based on currents of d and q axes determined based on the set torque, the law of sines, and relationships between a charging current of a charging device and currents of three phases a, b, and c.

9. The boost charging control apparatus according to claim 7, wherein the set torque is greater than or equal to zero and less than 50 Nm.

10. A computer-readable storage medium, having stored thereon a computer program, wherein, when executed by a processor, the computer program causes the processor to execute a method comprising:
- selecting, based on an electrical angle θ of a motor, two phase windings of the motor with top two inductance strengths as working windings;
- setting a current of the other phase winding as zero, and calculating currents of the two phase windings based on a set torque of the motor; and
- controlling the currents of the two phase windings to reach the calculated currents, so as to cause the motor to generate the set torque.

* * * * *